(12) United States Patent
Danzyger et al.

(10) Patent No.: US 7,038,664 B2
(45) Date of Patent: May 2, 2006

(54) INPUT DEVICE FOR SCROLLING A COMPUTER DISPLAY

(75) Inventors: Howard L. Danzyger, Aurora, IL (US); John E. Herbst, Streamwood, IL (US); William R. Valiunas, Aurora, IL (US)

(73) Assignee: Fellowes, Inc., Itasca, IL (US)

( * ) Notice: Subject to any disclaimer, the term of this patent is extended or adjusted under 35 U.S.C. 154(b) by 306 days.

(21) Appl. No.: 10/002,835

(22) Filed: Nov. 1, 2001

(65) Prior Publication Data
US 2003/0080942 A1    May 1, 2003

(51) Int. Cl.
*G09G 5/08* (2006.01)

(52) U.S. Cl. ............... 345/163; 345/167; D14/402

(58) Field of Classification Search ........ 345/156–158, 345/173, 179, 184; 463/37–38; D14/402–417
See application file for complete search history.

(56) References Cited

U.S. PATENT DOCUMENTS

| | | |
|---|---|---|
| 4,602,251 A | 7/1986 | Sawada et al. |
| 4,786,895 A | 11/1988 | Castaneda |
| 4,787,051 A | 11/1988 | Olson |
| 4,961,138 A | 10/1990 | Gorniak |
| 5,053,761 A | 10/1991 | Webster, III. |
| 5,095,303 A | 3/1992 | Clark et al. |
| 5,298,919 A | 3/1994 | Chang |
| 5,313,229 A | 5/1994 | Gilligan et al. |
| 5,374,942 A | 12/1994 | Gilligan et al. |
| 5,396,030 A | 3/1995 | Matsumiya et al. |
| 5,446,481 A | 8/1995 | Gillick et al. |
| 5,473,344 A | 12/1995 | Bacon et al. |
| 5,530,455 A | 6/1996 | Gillick et al. |
| 5,633,657 A * | 5/1997 | Falcon ............ 345/145 |
| 5,657,051 A | 8/1997 | Liao |
| 5,670,990 A | 9/1997 | Bidiville et al. |
| 5,680,157 A | 10/1997 | Bidiville et al. |
| 5,808,568 A | 9/1998 | Wu |
| 5,872,566 A | 2/1999 | Bates et al. |
| 5,883,619 A | 3/1999 | Ho et al. |
| 5,889,236 A * | 3/1999 | Gillespie et al. ...... 178/18.01 |
| 5,903,267 A | 5/1999 | Fisher |
| 5,912,661 A | 6/1999 | Siddiqui |
| 5,917,473 A | 6/1999 | Yeh |
| 5,963,197 A | 10/1999 | Bacon et al. |
| 6,014,130 A | 1/2000 | Yung-Chou |
| 6,061,004 A * | 5/2000 | Rosenberg ............ 341/20 |
| 6,064,370 A | 5/2000 | Wang et al. |
| 6,075,518 A | 6/2000 | Pruchniak |

(Continued)

*Primary Examiner*—Amr A. Awad
*Assistant Examiner*—Tom Sheng
(74) *Attorney, Agent, or Firm*—Brinks Hofer Gilson & Lione

(57) ABSTRACT

An input device such as a mouse, track ball or joystick that has a rotatable element for scrolling a graphical display presented on an apparatus. The rate of scrolling of the graphical display is constant and independent of the rate of rotation of the rotatable element. The input device further comprises a motion signal generator, a motion signal interpreter and a software driver. The motion signal generator detects motion of the rotatable element and generates motion signals. The motion signal interpreter checks for generation of motion signals within predetermined periods of time. If at least one motion signal is detected within the predetermined period of time the motion signal interpreter generates one output signal at the end of the predetermined period of time. When the software driver receives an output signal, the software driver generates a line scrolling command to scroll the graphical display.

9 Claims, 5 Drawing Sheets

U.S. PATENT DOCUMENTS

| | | |
|---|---|---|
| 6,075,533 A | 6/2000 | Chang |
| 6,104,383 A | 8/2000 | Shipman |
| 6,128,006 A | 10/2000 | Rosenberg et al. |
| 6,157,381 A | 12/2000 | Bates et al. |
| 6,166,721 A * | 12/2000 | Kuroiwa et al. ............ 345/163 |
| 6,198,473 B1 | 3/2001 | Armstrong |
| 2002/0030667 A1* | 3/2002 | Hinckley et al. ........... 345/173 |
| 2002/0158844 A1* | 10/2002 | McLoone et al. ........... 345/163 |

* cited by examiner

INPUT DEVICE FOR SCROLLING A COMPUTER DISPLAY

BACKGROUND OF THE INVENTION

The present invention generally relates to computer input devices. In particular, the invention relates to computer mice having input apparatus, such as a scroll wheel or a track ball, for scrolling a computer display.

It is commonly known to computer users that Windows based operating systems, such as Windows by Microsoft Corporation, and the applications that run under them, may only display a portion of a document or computer program on a display screen if the viewable area of the document or program is larger than the viewing area of the display screen. In this situation, a user must scroll through the document or program to view the entire document or program. Depending on the size and orientation of the viewable area of a document or computer program, the user may need to scroll in a vertical and/or horizontal direction. While scrolling may be accomplished by using software scroll bars generated by the windows based application, computer mice having scroll wheels or track balls may also be used to input scrolling commands.

Computer mice having scroll wheels are well known in the art. Scroll wheels are generally finger operated rotatable discs that protrude from a surface of the computer mouse. Typically, the scroll wheel is located between the two buttons of a conventional two button mouse and can be operated by the index finger. Although capable of performing many functions, scroll wheels are particularly useful for providing a user with a convenient and efficient way for inputting scrolling commands. Finger operated track balls have also been used to input scrolling commands and provide the added benefit of generating simultaneous vertical and horizontal scrolling inputs.

Prior art computer mice with scroll wheels or track balls allow a user to scroll a display at a rate relative to the rate of rotation of the scroll wheel or track ball. If a user rotates the scroll wheel quickly, the display screen also scrolls quickly. A variable and rapid scroll rate, however, can result in somewhat unpredictable movement of the viewed section of the document. Due to rapid movement of words and images on the display screen a user may become confused as to where he or she is in a particular document. This can result in inefficient computing.

BRIEF SUMMARY OF THE INVENTION

The preferred embodiment of the present invention addresses these short comings of the prior art by providing a smooth, constant scroll rate, independent of the rate of rotation of the scroll wheel. Scrolling of a document is therefore constant and predictable.

In one aspect, the invention provides a graphical display scrolling system made up of an apparatus for displaying viewable elements of a graphical display and an input device with a rotatable element. Rotation of the rotatable element causes the viewable elements of a graphical display to scroll at a rate that is constant and independent of the rate of rotation of the rotatable element. The apparatus is generally a computer but may be any apparatus that processes and displays graphical information.

In another aspect, the invention provides an input device that has a rotatable element, a motion signal generator, a motion signal interpreter and a software driver. The motion signal generator detects motion of the rotatable element and generates motion signals. The motion signal interpreter checks for generation of motion signals within predetermined periods of time. If at least one motion signal is detected within the predetermined period of time, the motion signal interpreter generates one output signal at the end of the predetermined period of time. When the software driver receives an output signal, the software driver generates a line scrolling command to scroll the graphical display. The scrolling rate of the graphical display is constant when the rotatable element is rotated.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION OF THE PRESENTLY PREFERRED EMBODIMENTS OF THE INVENTION

Figure 1:
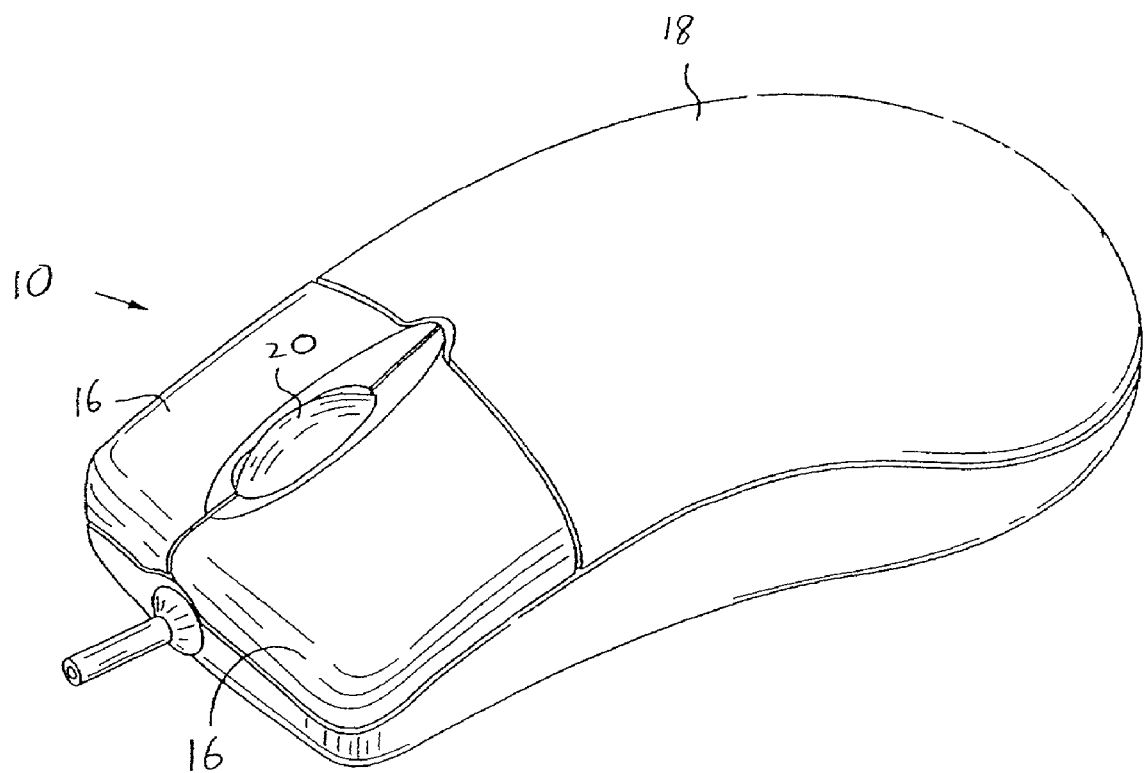
FIG. 1 is an external perspective view of the preferred embodiment of the present invention.
Figure 3:
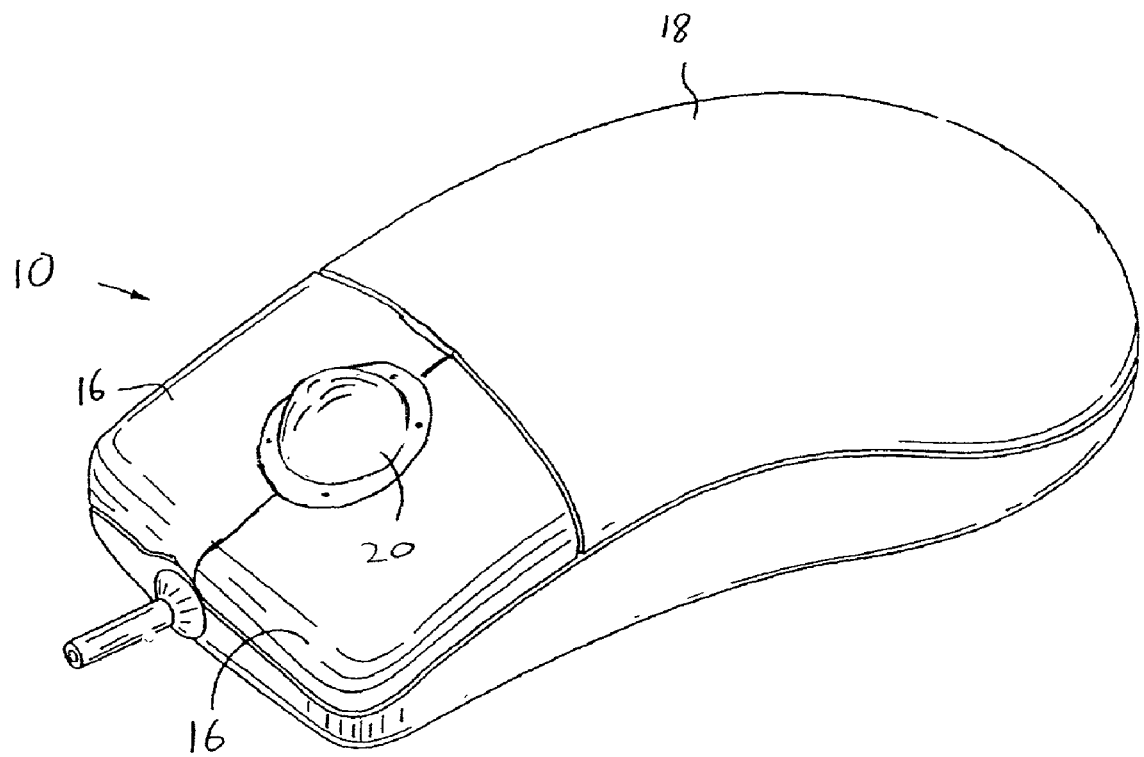
FIG. 3 is an external perspective view of another preferred embodiment of the present.

Turning now to the drawings, FIG. 1 depicts an input device 10 having a rotatable element 20 that protrudes through the top cover 18 of the device 10. The rotatable element 20 is preferably a scroll wheel. As illustrated in FIG. 3, the rotatable element 20 may also be a finger operated track ball. The input device 10 also preferably comprises at least one finger operated button 16 located on the external housing of the device 10.

Figure 2:
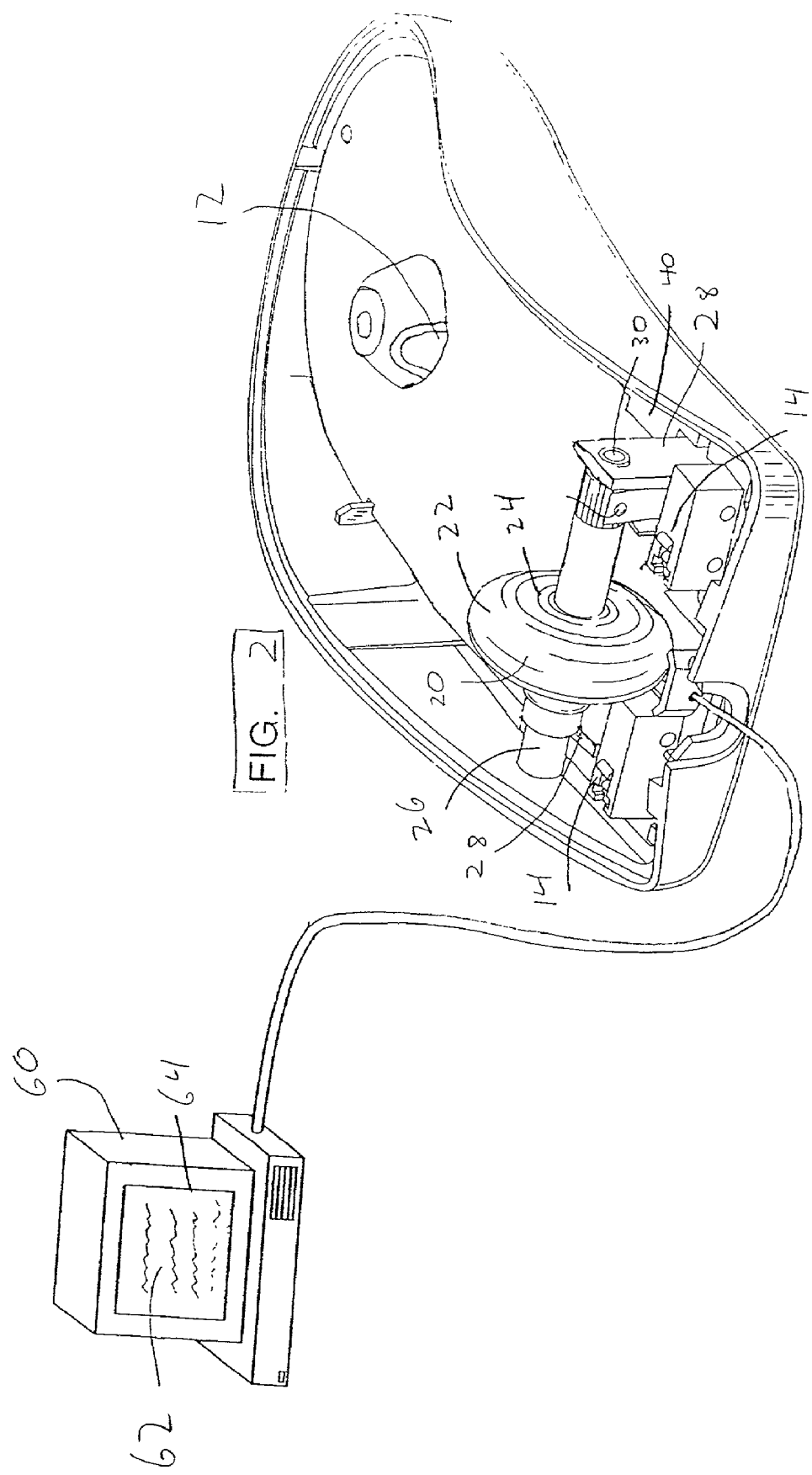
FIG. 2 is an internal perspective view of the preferred embodiment of the present invention while connected to a computer.

FIG. 2 is a perspective view showing the internal components forming the input device 10 according to one preferred embodiment of the invention. In this embodiment the input device 10 comprises a roller ball 12 for x,y cursor positioning on a computer display screen. One skilled in the art will recognize that although a roller ball 12 is shown in the preferred embodiment, x,y cursor positioning may also by achieved through other positioning apparatus such as an optical sensor located on the bottom of the input device 10 that measures changes in surface features or through other inputs devices such as a palm operated track ball or a joystick.

The preferred embodiment of the present invention further comprises at least one microswitch input 14 that corresponds to at least one finger operated button 16 so that depression of the button 16 activates the microswitch input 14. The button 16 and microswitch input 14 provide additional functionality to allow a user to select and manipulate objects and text within a computer program. Preferably, the input device 10 has two finger operated buttons 16, although it may also have three or more finger operated buttons.

The rotatable element 20 is used to translate rotational inputs from a user's finger into scrolling commands on the display. Preferably, the rotatable element 20 is located on the top surface of the input device and is designed to be easily accessible to the user. It is to be understood, however, that the rotatable element 20 can be located on the input device at any location that may be convenient for the user. For example, the rotatable element 20 may be located on the side or the bottom of the input device. In one embodiment of the present invention, the rotatable element is located between two input buttons 16 at the forward section of the input device 10. As illustrated in FIGS. 1 and 2, the rotatable element 20 can be a scroll wheel. A finger operated track ball, as shown in FIG. 3 however, may also be used for inputting scrolling commands.

In an additional embodiment of the present invention, the rotatable element 20 may also be the roller ball of the input device. In this embodiment, motion of the input device across a surface provides rotational input to the roller ball. The direction of this rotational input can be used to generate scrolling commands. Preferably, the input device described herein also has a finger operated track ball to provide x,y cursor positioning. In this embodiment, x,y cursor positioning is inputted through rotation of the track ball and scrolling is inputted through motion of the input device, which, consequently, results in rotational motion of the roller ball. One skilled in the art would understand that an optical sensor may also be used in place of the roller ball for inputting scrolling commands.

In a preferred embodiment, the scroll wheel provides one dimensional input of scrolling commands where backward and forward turning of the scroll wheel results in scrolling a computer display in either a vertical or horizontal direction. In this embodiment, the rotatable element 20 comprises an elastomer outer ring 22 for providing enhanced gripping features and a rigid inner hub 24 for supporting the outer ring 22. The rotatable element 20 is connected with an axially mounted spindle 26 supported by one or more vertical support structures 28 that allow free rotation of the rotatable element 20 about the spindle 26.

In another embodiment of the present invention, the rotatable element 20 is a finger operated track ball as best seen in FIG. 3. In this embodiment, rotation of the track ball results in two dimensional scrolling where left/right and forward/backward rotation of the trackball allows inputs for simultaneous vertical and horizontal scrolling of a computer display.

The device of the present invention further comprises a motion signal generator 30 and a motion interpreter 40. A motion signal generator 30 is preferably located proximate to the rotatable element 20 and is responsive to motion of the rotatable element 20. The motion signal generator 30 detects rotational motion of the rotatable element 20 and generates a motion signal in response. Preferably, the motion signal generator 30 is a rotary contactor located on a vertical support structure 28. The rotary contactor is connected with the spindle 26 and is responsive to motion of the spindle 26. When the rotatable element 20 is rotated, the spindle rotates 26 the rotary contactor, generating electrical motion signals. These motion signals are then transmitted to the motion interpreter 40. Although the motion signal generator 30 is disclosed as a rotary contactor in FIG. 2, one skilled in the art would recognize that other apparatus, such as an optical encoder, may also be used for detecting rotary motion and generating responsive motion signals.

Figure 4:
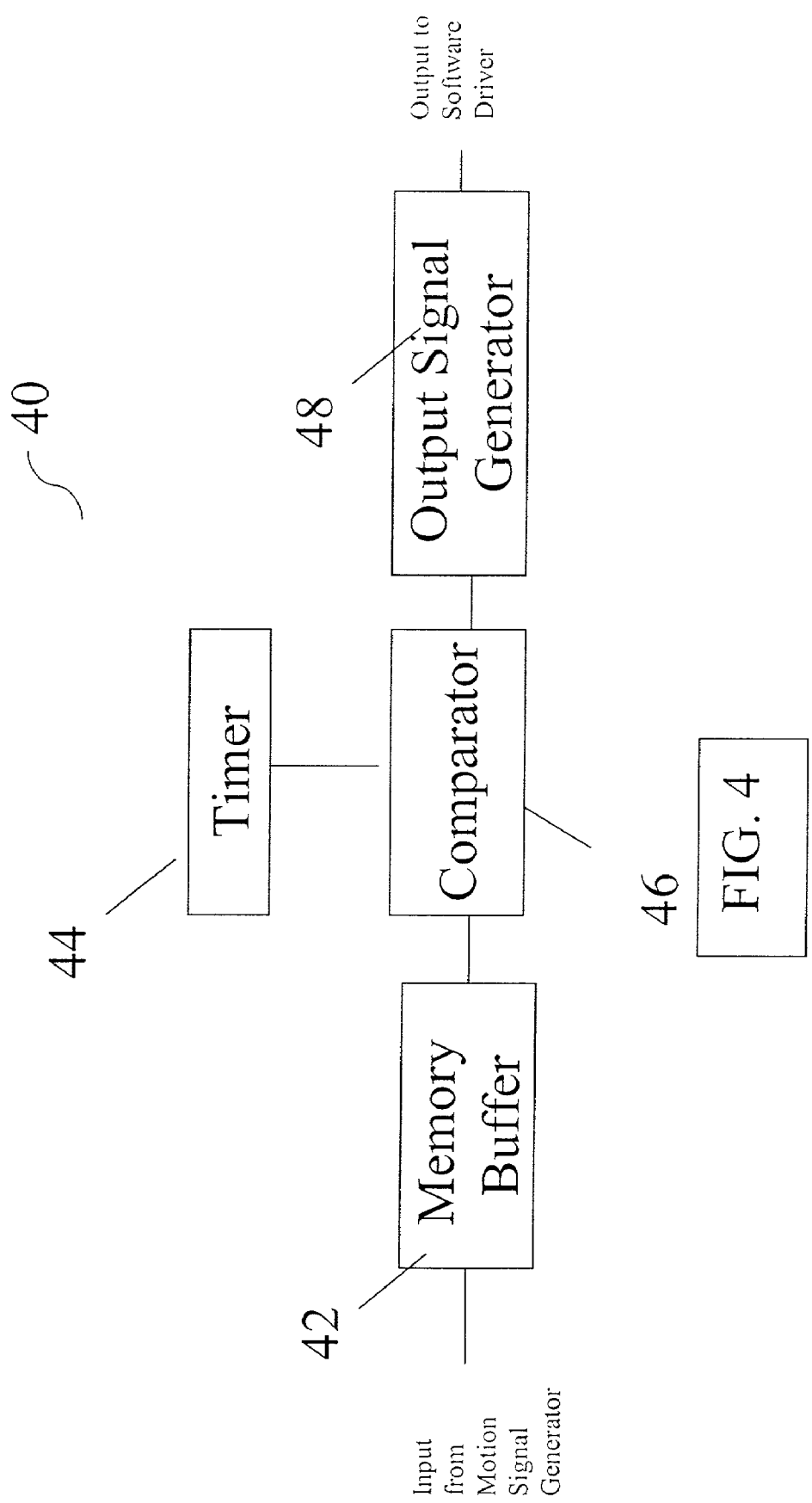
FIG. 4 is a schematic illustrating the components of the motion signal interpreter of the preferred embodiment of the present invention

The motion signal interpreter 40 is in communication with the motion signal generator 30 for receiving motion signals. The motion signal interpreter 40 is capable of reading motion signals and is in the nature of an integrated circuit with a memory module. Referring to FIG. 4, the motion signal interpreter 40 preferably comprises a memory buffer 42, a timer 44, a comparator 46, and an output signal generator 48. Motion signals received by the motion signal interpreter 40 are stored temporarily in the memory buffer 42. The timer 44 is a device that measures predetermined periods of time. In the preferred embodiment, the timer 44 measures a predetermined period of time between about 1 and about 300 milliseconds, preferably between about 10 and about 50 milliseconds, and more preferably between about 15 and about 25 milliseconds. The comparator 46 is in communication with both the memory buffer 42 and the timer 44. At the end of a predetermined period of time, as measured by the timer 44, the comparator 46 checks the memory buffer 42 to see if a motion signal has been sent to the memory buffer 42 within a previous predetermined period of time. If a motion signal has not been received, the comparator 46 waits until the next predetermined period of time passes before checking the memory buffer 42 again. If one or more motion signals have been received within the previous predetermined period of time, the comparator 46 instructs the output signal generator 48 to generate one output signal.

A software driver in communication with the input device 10 is capable of receiving output signals from the motion signal interpreter 40 and generating line scrolling commands in response to reception of the output signals. The software driver communicates with an apparatus that processes and displays graphical information such as a computer, a graphical interface to the Internet, or a graphical interface to another network. For convenience the apparatus will be described as a computer, however, one skilled in the art will understand that the any of the embodiments listed above may also be used. In one embodiment, the apparatus is a computer 60 operating a computer program 62 that generates a graphical display on the computer display screen 64. The software driver is preferably resident on the computer 60 and communicates with the computer program 62. The computer program 62 is responsive to the software driver such that line scrolling commands generated by the software driver cause the viewable portion of the graphical display to scroll on the computer display screen 64.

Figure 5:
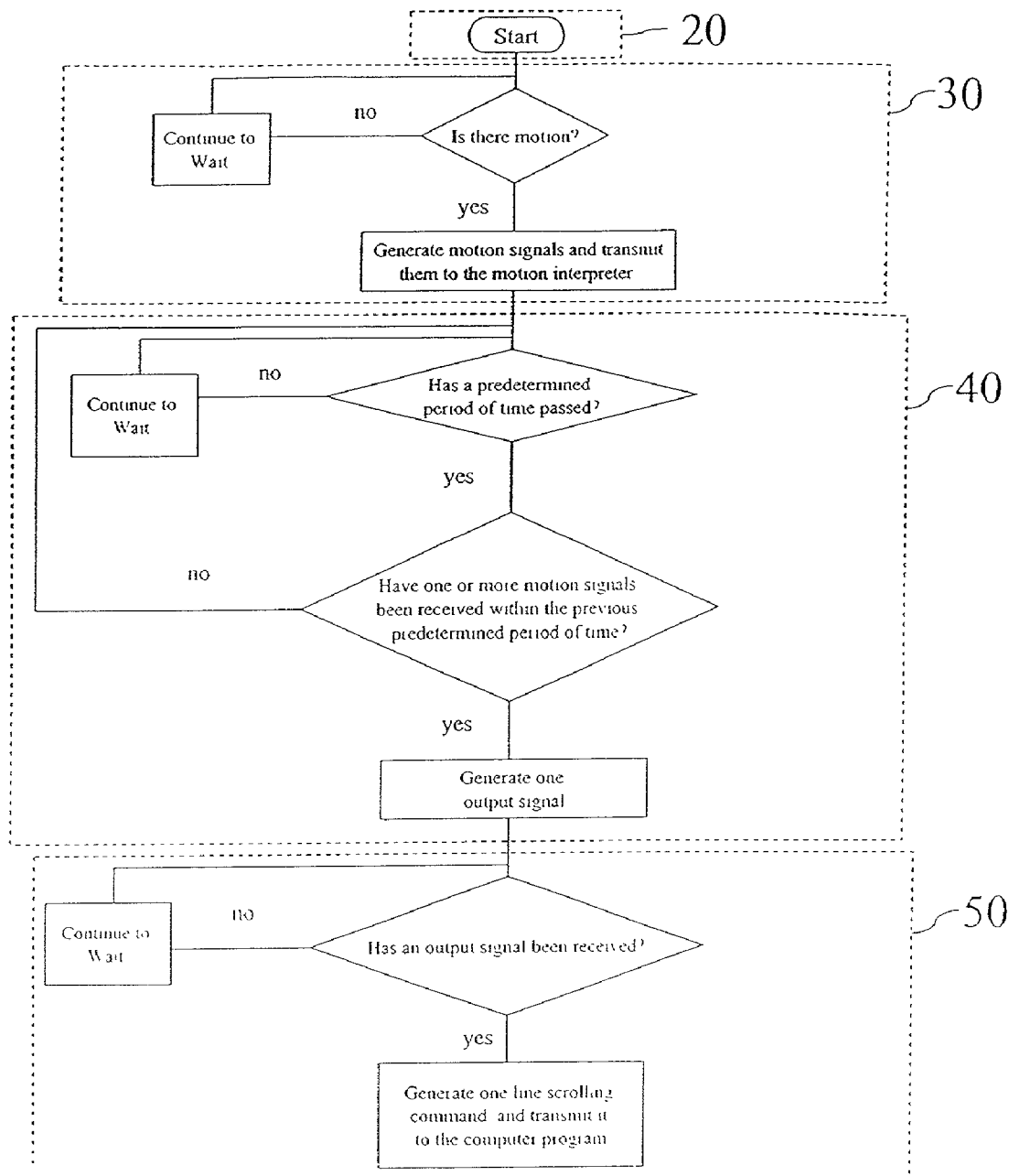
FIG. 5 is a flow diagram illustrating the components of the preferred embodiment of the present invention and the flow of data through the components.

In operation, a user who wishes to scroll a graphical display rotates the rotatable element 20 of the input device 10. As shown in FIG. 5, the motion signal generator 30 monitors the rotatable element 20 for rotation. When the motion signal generator 30 detects rotation of the rotatable element 20, the motion signal generator 30 generates motion signals and transmits the motion signals to the motion signal interpreter 40. At the end of a predetermined period of time, the motion signal interpreter 40 checks if one or more motion signals has been sent within the previous predetermined period of time. In the preferred embodiment, the predetermined period of time is between about 15 milliseconds and about 25 milliseconds. If a motion signal is not received within the predetermined period of time the motion signal interpreter 40 waits for another predetermined period of time to pass until it checks again for reception of a motion signal. Alternatively, if one or more motion signals were received within the previous predetermined period of time, the motion signal interpreter 40 generates one output signal and transmits it to the software driver 50.

In a preferred embodiment of the motion signal interpreter 40, a memory buffer 42 temporarily stores the motion signals from the motion signal generator 30. The comparator 46 monitors the timer 44 and waits for the predetermined period of time to pass. At the end of the period, the comparator 46 checks the memory buffer 42 to see if a motion signal has been sent within the previous predetermined period of time. If the memory buffer 42 has not received a motion signal within the previous predetermined period of time, the comparator 46 waits for the end of the next predetermined period of time to again check the memory buffer 42 for motion signals. If the comparator 46 sees that one or more motion signals have been received by the memory buffer 42 within the previous predetermined period of time, the comparator 46 instructs the output signal generator 48 to generate one output signal for transmission to the software driver. A maximum of one output signal is generated per predetermined period of time regardless of the number of motion signals received within the previous predetermined period of time. The memory buffer 42 is then cleared of motion signals.

The software driver 50 continuously monitors for the reception of an output signal. If an output signal is received, the software driver 50 generates a line scrolling command. The line scrolling command is transmitted to the computer program 62, causing the viewable elements of the graphical display to line scroll on the display screen 64.

The above operation results in a constant scroll rate, independent of the rate of rotation of the rotatable element. Only one output signal, and therefore only one line scrolling command, is generated at the end of the predetermined period of time, without regard to whether several motion signals were received within that previous predetermined period of time.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. An input device for scrolling a graphical display comprising:
   a. a rotatable element;
   b. a motion signal generator responsive to motion of the rotatable element, wherein the motion signal generator detects motion of the rotatable element and generates motion signals;
   c. a motion signal interpreter in communication with the motion signal generator, the motion signal interpreter providing one output signal at the end of a predetermined period of time when one or more motion signals are detected within the predetermined period of time; and
   d. a software driver in communication with the motion signal interpreter wherein the software driver accepts output signals from the motion interpreter and generates line scrolling commands in response to reception of the output signals, wherein the scrolling rate of the graphical display is constant when the rotatable element is rotated and independent of the rate of rotation.

2. The input device of claim 1 wherein the motion interpreter comprises:
   a. a memory buffer that receives and stores motion signals from the motion signal generator;
   b. a timer that measures the predetermined period of time;
   c. a comparator connected with the memory buffer and the timer to check if a motion signal has been received by the memory buffer within the predetermined period of time; and
   d. an output signal generator in communication with the software driver.

3. The input device of claim 2 wherein the predetermined period of time is within the range of about 1 and about 300 milliseconds.

4. The input device of claim 3 wherein the predetermined period of time is within the range of about 15 and about 25 milliseconds.

5. The input device of claim 2 wherein the rotatable element is a scroll wheel.

6. The input device of claim 2 wherein the rotatable element is a track ball.

7. A graphical display scrolling device comprising:
   a motion signal generator operable to detect rotational motion of a rotatable element; and
   a motion signal interpreter having a memory buffer that stores motion signals generated by the motion signal generator for a predetermined period of time, said motion signal interpreter generates an output signal at the end of the predetermined period of time when one or more motion signals are detected within the predetermined period of time, wherein a line scrolling command for a graphical display is generated in response to each output signal and the scrolling rate of the graphical display is constant when the rotatable element is rotated and independent of the rate of rotation.

8. The graphical display scrolling device of claim 7 wherein the rotatable element is a scroll wheel.

9. The graphical display scrolling device of claim 7 wherein the rotatable element is a track ball.

* * * * *